(12) United States Patent
Hillier et al.

(10) Patent No.: US 7,502,713 B2
(45) Date of Patent: Mar. 10, 2009

(54) METHOD AND SYSTEM FOR DETERMINING PARAMETER DISTRIBUTION, VARIANCE, OUTLIERS AND TRENDS IN COMPUTER SYSTEMS

(75) Inventors: Andrew D. Hillier, Toronto (CA); Tom Yuyitung, Toronto (CA)

(73) Assignee: Cirba Inc., Richmond Hill (CA)

( * ) Notice: Subject to any disclaimer, the term of this patent is extended or adjusted under 35 U.S.C. 154(b) by 92 days.

(21) Appl. No.: 11/548,938

(22) Filed: Oct. 12, 2006

(65) Prior Publication Data
US 2008/0011569 A1 Jan. 17, 2008

Related U.S. Application Data

(60) Provisional application No. 60/805,701, filed on Jun. 23, 2006.

(51) Int. Cl.
G06F 19/00 (2006.01)
(52) U.S. Cl. .................. 702/181; 709/204; 709/223; 709/224; 709/227
(58) Field of Classification Search .............. 702/181; 709/204, 223, 224, 227
See application file for complete search history.

(56) References Cited

U.S. PATENT DOCUMENTS 6,138,078 A  10/2000  Canada et al.
6,148,335 A * 11/2000  Haggard et al. ............ 709/224
6,564,174 B1 * 5/2003  Ding et al. ................. 702/186
2005/0027466 A1  2/2005  Steinmetz et al.
2006/0020924 A1  1/2006  Lo et al.

FOREIGN PATENT DOCUMENTS

CA  2420076 A1  2/2003
CA  2583582 A1  5/2006
WO  WO 03/009140 A2  1/2003

OTHER PUBLICATIONS

Search Report from PCT/CA2007/001122 dated Oct. 29, 2007.

* cited by examiner

Primary Examiner—Tung S Lau
Assistant Examiner—Sujoy K Kundu
(74) Attorney, Agent, or Firm—Brett J. Slaney; John R.S. Orange; Blake, Cassels & Graydon LLP

(57) ABSTRACT

A system and method for generating statistical reports showing distribution, variance, outliers and trends for parameters across a set of computer systems is provided. The reports are generated based on audited data for each system that pertains to the parameters. A distribution report assesses the uniformity of the parameters of a population of systems and provides frequency distributions and statistics describing the data values from the analyzed systems. A variance report assesses the conformity of one or more target systems against a reference data set comprised of a set of baseline systems. The report compares each target system individually against the reference data set to measure the consistency of the target's parameters. A trend report shows trends in the uniformity and conformity measures of the parameters by comparing the statistical analysis results of sets of systems at two or more points in time or the different systems at the same time.

25 Claims, 28 Drawing Sheets

Sample System Data excerpted from
Generic System Information Module

*Hardware Details Object*

| Property | Value |
|---|---|
| Total CPUs | 2 |
| CPU Architecture | Intel™ Xeon™ |
| CPU Speed (GHz) | 3.0 |
| Total Memory (MB) | 1024 |

*Operating System Details Object*

| Property | Value |
|---|---|
| Hostname | server01 |
| OS Name | Windows™ |
| OS Version | 2003 |
| Patch Level | SP2 |

*Network Interfaces Table*

| Interface Name | IP Address | Subnet Mask | Default Gateway | Domain Name |
|---|---|---|---|---|
| LAN | 10.0.0.101 | 255.255.255.0 | 10.0.0.1 | abc.com |

Figure 10

Sample Metadata Category Definition and Weights
Generic System Information Module

*Hardware Details Object*

| Property | Meta Category | Conformity Score Weight |
|---|---|---|
| Total CPUs | Hardware Configuration | 0.5 |
| CPU Architecture | Hardware Configuration | 0.5 |
| CPU Speed (GHz) | Hardware Configuration | 0.5 |
| Total Memory (MB) | Hardware Configuration | 0.5 |

*Operating System Details Object*

| Property | Meta Category | Conformity Score Weight |
|---|---|---|
| Hostname | OS Configuration | 0 |
| OS Name | OS Configuration | 1 |
| OS Version | OS Configuration | 1 |
| Patch Level | OS Configuration | 1 |

*Network Interfaces Table*

| Property | Meta Category | Conformity Score Weight |
|---|---|---|
| Interface Name | OS Configuration | 0 |
| IP Address | OS Configuration | 0 |
| Subnet Mask | OS Configuration | 1 |
| Default Gateway | OS Configuration | 1 |
| Domain Name | OS Configuration | 1 |

Figure 11

Sample Audit Data for a Set of Systems

| System Name | OS Name | Total CPUs | Domain Name | IP Address |
|---|---|---|---|---|
| server01 | Windows | 2 | abc.com | 10.0.0.101 |
| server02 | Windows | 2 | abc.com | 10.0.0.102 |
| server03 | Windows | 2 | abc.com | 10.0.0.103 |
| server04 | Windows | 2 | abc.com | 10.0.0.104 |
| server05 | Windows | 2 | abc.com | 10.0.0.105 |
| server06 | Windows | 2 | abc.com | 10.0.0.106 |
| server07 | Windows | 2 | abc.com | 10.0.0.117 |
| server08 | Windows | 2 | abc.com | 10.0.0.118 |
| server09 | Windows | 2 | abc.com | 10.0.0.109 |
| server10 | Windows | 2 | abc.com | 10.0.0.110 |
| server11 | Linux | 2 | abc.com | 10.0.0.111 |
| server12 | Linux | 2 | abc.com | 10.0.0.112 |
| server13 | Linux | 2 | abc.com | 10.0.0.113 |
| server14 | Solaris | 2 | abc.com | 10.0.0.114 |
| server15 | AIX | 4 | abc.com | 10.0.0.115 |

Figure 13

Frequency Distributions based on Sample Data

| OS Name | Count |
|---|---|
| Windows | 10 |
| Linux | 3 |
| Solaris | 1 |
| AIX | 1 |

| Total CPUs | Count |
|---|---|
| 2 | 14 |
| 4 | 1 |

| Domain Name | Count |
|---|---|
| abc.com | 15 |

| IP Address | Count |
|---|---|
| 10.0.0.101 | 1 |
| 10.0.0.102 | 1 |
| 10.0.0.103 | 1 |
| 10.0.0.104 | 1 |
| 10.0.0.105 | 1 |
| 10.0.0.106 | 1 |
| 10.0.0.107 | 1 |
| 10.0.0.108 | 1 |
| 10.0.0.109 | 1 |
| 10.0.0.110 | 1 |
| 10.0.0.111 | 1 |
| 10.0.0.112 | 1 |
| 10.0.0.113 | 1 |
| 10.0.0.114 | 1 |
| 10.0.0.115 | 1 |

Figure 14

Statistics for Sample Data Properties

| Property | Unique Values | Uniformity Index | Mean | Min | Max | Std Dev |
|---|---|---|---|---|---|---|
| OS Name | 4 | 0.68 | N/A | N/A | N/A | N/A |
| Total CPUs | 2 | 0.93 | 2.1 | 2 | 4 | 0.52 |
| Domain Name | 1 | 1 | N/A | N/A | N/A | N/A |
| IP Address | 15 | 0 | N/A | N/A | N/A | N/A |

Figure 15

Statistical Distribution Report
Conformity Scorecard
*View Full Statistics | Outlier Summary*

| CS % | Hardware | OS | Overall |
|---|---|---|---|
| server15 | 54 | 32 | 17 |
| server14 | 95 | 32 | 30 |
| server11 | 95 | 73 | 69 |
| server12 | 95 | 73 | 69 |
| server13 | 95 | 73 | 69 |
| server01 | 95 | 92 | 87 |
| server02 | 95 | 92 | 87 |
| server03 | 95 | 92 | 87 |
| server04 | 95 | 92 | 87 |
| server05 | 95 | 92 | 87 |
| server06 | 95 | 92 | 87 |
| server07 | 95 | 92 | 87 |
| server08 | 95 | 92 | 87 |
| server09 | 95 | 92 | 87 |
| server10 | 95 | 92 | 87 |

Figure 16

Statistical Distribution Report

Summary of Outliers

| Module | Object | Property | Instance | Value (Occurences) | Conformity Score |
|---|---|---|---|---|---|
| Generic System Information | Operating System Details | OS Name | - | AIX (1/15) | 0.32 |
| Generic System Information | Operating System Details | OS Name | - | Solaris (1/15) | 0.32 |
| Generic System Information | Hardware Details | Total CPUs | - | 4 (1/15) | 0.54 |
| Generic System Information | Operating System Details | OS Name | - | Linux (3/15) | 0.73 |
| Generic System Information | Operating System Details | OS Name | - | Windows (10/15) | 0.92 |
| Generic System Information | Hardware Details | Total CPUs | - | 2 (14/15) | 0.95 |

Figure 17

Statistical Distribution Report
Generic System Information Module

*Hardware Details Object*

| Property | Value |
|---|---|
| Total CPUs | AVG: 2.1 [UI: 0.93] |
| CPU Architecture | TOP: Intel™ Xeon™ [UI: 0.80] |
| CPU Speed (GHz) | AVG: 2.79 [UI: 0.70] |
| Total Memory (MB) | 1024 [UI: 0.84] |

*Operating System Details Object*

| Property | Value |
|---|---|
| Hostname | ALL UNIQUE |
| OS Name | TOP: Windows™ [UI: 0.68] |
| OS Version | TOP: 2003 [UI: 0.68] |
| Patch Level | TOP: SP2 [UI: 0.68] |

*Network Interfaces Table*

| Interface Name | Occurs in Table | IP Address | Subnet Mask | Default Gateway | Domain Name |
|---|---|---|---|---|---|
| LAN | 5/10 | ALL UNIQUE | ALL SAME: 255.255.255.0 | ALL SAME: 10.0.0.1 | ALL SAME: abc.com |
| eth0 | 3/10 | ALL UNIQUE | ALL SAME: 255.255.255.0 | ALL SAME: 10.0.0.1 | ALL SAME: abc.com |
| dmfe1 | 1/10 | ALL UNIQUE | ALL SAME: 255.255.255.0 | ALL SAME: 10.0.0.1 | ALL SAME: abc.com |
| inet | 1/10 | ALL UNIQUE | ALL SAME: 255.255.255.0 | ALL SAME: 10.0.0.1 | ALL SAME: abc.com |

Figure 18

Statistical Distribution Report

Generic System Information Module

*Selected Property Details*

| Property | Occurs in Object | # Unique | Top 1 (CI) | Top 2 (CI) | Top 3 (CI) | Mean | Range | Std Dev | UI |
|---|---|---|---|---|---|---|---|---|---|
| OS Name | 15/15 (100%) | 4 | Windows (0.92) | Linux (0.73) | AIX, Solaris (0.32) | - | - | - | 0.68 |
| Total CPUs | 15/15 (100%) | 2 | 2 (0.89) | 4 (0.09) | - | 2.1 | 2-4 | 0.52 | 0.93 |
| Domain Name | 15/15 (100%) | 1 | abc.com (1.00) | - | - | - | - | - | 1 |
| IP Address | 15/15 (100%) | 10 | - | - | - | - | - | - | 0 |

Figure 19

Statistical Distribution Report

Generic System Information Module

*Instance Details: Network Interfaces*

| Property | Occurs in Object | # Unique | Top 1 | Top 2 | Top 3 | Mean | Range | Std Dev | UI |
|---|---|---|---|---|---|---|---|---|---|
| Interface Name | 15/15 (100%) | 4 | LAN (67%) | eth0 (20%) | dmfe1, inet (7%) | - | - | - | 0.53 |
| IP Address | 15/15 (100%) | 15 | ALL UNIQUE | - | - | - | - | - | 0 |
| Subnet Mask | 15/15 (100%) | 1 | ALL SAME: 255.255.255.0 | - | - | - | - | - | 1 |
| Default Gateway | 15/15 (100%) | 1 | ALL SAME: 10.0.0.1 | - | - | - | - | - | 1 |
| Domain Name | 15/15 (100%) | 1 | ALL SAME abc.com | - | - | - | - | - | 1 |

Figure 20

Statistical Distribution Report

Generic System Information Module

*System List for Property: OS Name*

| Value | Windows | Linux | Solaris | AIX |
|---|---|---|---|---|
| Systems | server01<br>server02<br>server03<br>server04<br>server05<br>server06<br>server07<br>server08<br>server09<br>server10 | server11<br>server12<br>server13 | server14 | server15 |
| System Count | 10 | 3 | 1 | 1 |

Figure 21

Sample Target System Data from Generic System Information Module

*Hardware Details Object*

| Property | Value |
|---|---|
| Total CPUs | 4 |
| CPU Architecture | Intel™ Xeon™ |
| CPU Speed (GHz) | 3.2 |
| Total Memory (MB) | 4096 |

*Operating System Details Object*

| Property | Value |
|---|---|
| Hostname | server99 |
| OS Name | Windows™ |
| OS Version | 2003 |
| Patch Level | SP2 |

*Network Interfaces Table*

| Interface Name | IP Address | Subnet Mask | Default Gateway | Domain Name |
|---|---|---|---|---|
| LAN | 192.168.0.199 | 255.255.255.0 | 192.168.0.1 | abc.ca |

Statistical Variance Report
Conformity Scorecard
*View Full Statistics | Outlier Summary*

| CS % | Hardware | OS | Overall |
|---|---|---|---|
| server99 | 68 | 6 | 4 |

Figure 23

Statistical Variance Report

*Target System: server99*

Module Details: Generic System Information

*Hardware Details Object*

| Property | Value | Aggregate Value | Rank or Percentile | Conformity Score |
|---|---|---|---|---|
| Total CPUs | 4 (13%) | AVG: 2.1 [UI: 0.93] | 100% | 0.68 |
| CPU Architecture | Intel™ Xeon™ | TOP: Intel™ Xeon™ [UI: 0.80] | 1 | 0 |
| CPU Speed (GHz) | 3.2 | AVG: 2.79 [UI: 0.70] | 100% | 0 |
| Total Memory (MB) | 4096 | AVG: 2252 [UI: 0.84] | 100% | 0 |

*Operating System Details Object*

| Property | Value | Aggregate Value | Rank or Percentile | Conformity Score |
|---|---|---|---|---|
| Hostname | server099 (6%) | ALL UNIQUE | N/A | 0 |
| OS Name | Windows™ (69%) | TOP: Windows™ [UI: 0.68] | 1 | 0.92 |
| OS Version | 2003 (69%) | TOP: 2003 [UI: 0.68] | 1 | 0 |
| Patch Level | SP2 (69%) | TOP: SP2 [UI: 0.68] | 1 | 0 |

Figure 24

Statistical Variance Report

*Target System: server99*

Summary of Outliers

| Module | Object | Property | Instance | Value (Occurrences) | Conformity Score |
|---|---|---|---|---|---|
| Generic System Information | Network Interfaces | Domain Name | LAN | abc.ca (1/16) | 0.07 |
| Generic System Information | Hardware Details | Total CPUs | - | 4 (2/16) | 0.68 |
| Generic System Information | Operating System Details | OS Name | - | Windows (11/16) | 0.92 |

Figure 25

Example Audit Data of Sample Systems from a Later Time

| System Name | OS Name | Total CPUs | Domain Name | IP Address |
|---|---|---|---|---|
| server01 | Windows | 2 | abc.com | 10.0.0.101 |
| server02 | Windows | 2 | abc.com | 10.0.0.102 |
| server03 | Windows | 2 | abc.com | 10.0.0.103 |
| server04 | Windows | 2 | abc.com | 10.0.0.104 |
| server05 | Windows | 2 | abc.com | 10.0.0.105 |
| server06 | Windows | 2 | abc.com | 10.0.0.106 |
| server07 | Windows | 2 | abc.com | 10.0.0.117 |
| server08 | Windows | 2 | abc.com | 10.0.0.118 |
| server09 | Windows | 2 | abc.com | 10.0.0.109 |
| server10 | Windows | 2 | abc.com | 10.0.0.110 |
| server11 | Linux | 2 | abc.com | 10.0.0.111 |
| server12 | Linux | 2 | abc.com | 10.0.0.112 |
| server13 | Linux | 2 | abc.com | 10.0.0.113 |
| server14 | Solaris | 2 | abc.com | 10.0.0.114 |
| server15 | AIX | 4 | abc.com | 10.0.0.115 |
| server16 | Linux | 4 | abc.com | 10.0.0.116 |
| server17 | Linux | 4 | abc.com | 10.0.0.117 |
| server18 | Linux | 4 | abc.com | 10.0.0.118 |
| server19 | Linux | 4 | abc.com | 10.0.0.119 |
| server20 | Linux | 4 | abc.com | 10.0.0.120 |

Figure 26

Comparison of Sample Baseline and Target Data Frequency Distributions

| OS Name | Baseline Count | Target Count | Change |
|---|---|---|---|
| Windows | 10 | 10 | 0 |
| Linux | 3 | 8 | +5 |
| Solaris | 1 | 1 | 0 |
| AIX | 1 | 1 | 0 |

| Total CPUs | Baseline Count | Target Count | Change |
|---|---|---|---|
| 2 | 14 | 14 | 0 |
| 4 | 1 | 6 | +5 |

| Domain Name | Baseline Count | Target Count | Change |
|---|---|---|---|
| abc.com | 15 | 15 | 0 |

| IP Address | Baseline Count | Target Count | Change |
|---|---|---|---|
| 10.0.0.101 | 1 | 1 | 0 |
| 10.0.0.102 | 1 | 1 | 0 |
| 10.0.0.103 | 1 | 1 | 0 |
| 10.0.0.104 | 1 | 1 | 0 |
| 10.0.0.105 | 1 | 1 | 0 |
| 10.0.0.106 | 1 | 1 | 0 |
| 10.0.0.107 | 1 | 1 | 0 |
| 10.0.0.108 | 1 | 1 | 0 |
| 10.0.0.109 | 1 | 1 | 0 |
| 10.0.0.110 | 1 | 1 | 0 |
| 10.0.0.111 | 1 | 1 | 0 |
| 10.0.0.112 | 1 | 1 | 0 |
| 10.0.0.113 | 1 | 1 | 0 |
| 10.0.0.114 | 1 | 1 | 0 |
| 10.0.0.115 | 1 | 1 | 0 |
| 10.0.0.116 | - | 1 | +1 |
| 10.0.0.117 | - | 1 | +! |
| 10.0.0.118 | - | 1 | +1 |
| 10.0.0.119 | - | 1 | +1 |
| 10.0.0.120 | - | 1 | +1 |

Figure 27

Statistical Trend Report

| Attribute | Baseline | Target |
|---|---|---|
| Audit Date | Jan 01, 2006 | Oct 01, 2006 |
| Number of Systems | 15 | 20 |

Property Uniformity Trends

| Property | Baseline Uniformity Index | Target Uniformity Index | Index Change | Trend |
|---|---|---|---|---|
| Total CPUs | 0.93 | 0.75 | -0.18 | Diverging |
| OS Name | 0.68 | 0.62 | -0.06 | Diverging |
| Domain Name | 1.00 | 1.00 | 0 | None |
| IP Address | 0 | 0 | 0 | None |

Property Value Conformity Trends

| Property | Value | Baseline Conformity Score | Target Conformity Score | Score Change | Trend |
|---|---|---|---|---|---|
| Total CPUs | 4 | 0.54 | 0.87 | +0.33 | Leader |
| OS Name | Linux | 0.73 | 0.87 | +0.14 | Leader |
| OS Name | AIX | 0.32 | 0.23 | -0.09 | Laggard |
| OS Name | Solaris | 0.32 | 0.23 | -0.09 | Laggard |
| Total CPUs | 2 | 0.95 | 0.88 | -0.07 | Laggard |
| OS Name | Windows | 0.92 | 0.90 | -0.02 | None |

Figure 28

METHOD AND SYSTEM FOR DETERMINING PARAMETER DISTRIBUTION, VARIANCE, OUTLIERS AND TRENDS IN COMPUTER SYSTEMS

This application claims priority from U.S. provisional patent application No. 60/805,701 filed Jun. 23, 2006.

FIELD OF THE INVENTION

The present invention relates to the empirical analysis of computer systems and has particular utility in determining and visualizing the distribution, variance, outliers and trends of parameters and characteristics across a set of computer systems.

DESCRIPTION OF THE PRIOR ART

The operation and behaviour of devices that utilize computing power such as servers, personal computers, laptops, personal digital assistants (PDA) etc., depend on thousands of parameters related to the operating system, hardware devices, software applications, patches, etc. Such devices often require configuration updates, hardware upgrades, patches and security features that can chance on a periodic basis.

For computing devices to function effectively and communicate with each other and the supporting infrastructure, they should be compatible and up to date. As organizations become more reliant on computing devices of all types to perform day-to-day activities, so does the need increase to periodically update and repair devices to minimize downtime and inefficiencies. Such a need extends beyond central and/or distributed computing environments to mobile devices, virtual networks etc.

As organizations grow and the necessary IT infrastructures also grow, the ability to evaluate parameters of computer systems becomes more and more difficult to manage. Often, the parameters in a computer system become very different from other computer systems, resulting in problems ranging from downtime to poor performance. These inconsistencies in system parameters would be of interest to the organizations.

It is therefore an object of the following to obviate or mitigate the above-described disadvantages.

SUMMARY OF THE INVENTION

In one aspect, a method for determining parameter distribution for one or more computer systems is provided comprising obtaining data pertaining to the one or more computer systems, the data comprising information pertaining to one or more parameters; generating a statistical model for the one or more computer systems using the data; and analyzing each of the one or more parameters for each of the one or more computer systems to determine the uniformity of respective ones of the parameters among the one or more systems.

In another aspect, a method for determining parameter variance for a target computer system in relation to one or more baseline computer systems is provided comprising obtaining a statistical model for the baseline computer systems using data pertaining to the baseline computer systems, the data comprising one or more parameters; obtaining data pertaining to the target computer system comprising at least one of the one or more parameters; and analyzing the target computer system with respect to the baseline computer systems using the statistical model and the data pertaining to the target computer system to determine the conformity of the parameters in the target system when compared to the parameters in the baseline systems.

In yet another aspect, a method for analyzing trends between a first data set and a second data set pertaining to one or more parameters for one or more computer systems is provided comprising generating a first statistical model using the first data set; cenerating a second statistical model using the second data set; and analyzing the first and second statistical models to determine one or more trends according to differences in values of the one or more parameters in the first and second data sets.

In yet another aspect, a computer implemented analysis program for determining at least one of uniformity and conformity of parameters for one or more computer systems is provided comprising an audit engine for obtaining audit data pertaining to the one or more computer systems, the data comprising one or more parameters; and an analysis engine for determining the at least one of the uniformity and conformity for values of the one or more parameters using the audit data.

In yet another aspect, a graphical interface for displaying scores pertaining to the conformity of one or more parameters for a plurality of computer systems is provided comprising a matrix of cells, each row of the matrix indicating one of the plurality of computer systems and each column of the matrix indicating a metadata category pertaining to one of the plurality of parameters, each cell displaying a score indicating the conformity of the respective one of the plurality of systems for a corresponding one of the one or more parameters, the score being computed according to predefined criteria.

BRIEF DESCRIPTION OF THE DRAWINGS

An embodiment of the invention will now be described by way of example only with reference to the appended drawings wherein:

FIG. 10 is a summary page for sample system module data.

FIG. 11 is a summary page for sample metadata category definitions and outlier weights.

FIG. 13 is a summary page for a sample audit data set.

FIG. 14 is a summary page showing frequency distributions for the sample data set of FIG. 13.

FIG. 15 is summary page showing statistics for the sample data set of FIG. 13.

FIG. 16 is a graphical distribution matrix.

FIG. 17 is a summary page listing outliers for the systems listed in the matrix of FIG. 16.

FIG. 18 is a summary page showing module details.

FIG. 19 is a summary page showing selected property details.

FIG. 20 is a summary page listing network interface instance details.

FIG. 21 is a summary page showing the list of systems corresponding to the OS name property.

FIG. 22 is a summary page listing module details for the target system to be compared against the baseline systems.

FIG. 23 is a graphical variance matrix for a target system in FIG. 22.

FIG. 24 is a summary page for a statistical variance report for a target system.

FIG. 25 lists a summary of outliers for the target system listed in FIG. 22.

FIG. 26 is a summary page showing another sample data set at a different time.

FIG. 27 is a summary page showing distribution frequencies for the data sets shown in FIGS. 13 and 26.

FIG. 28 shows a statistical trend report.

DETAILED DESCRIPTION OF THE INVENTION

Figure 1:
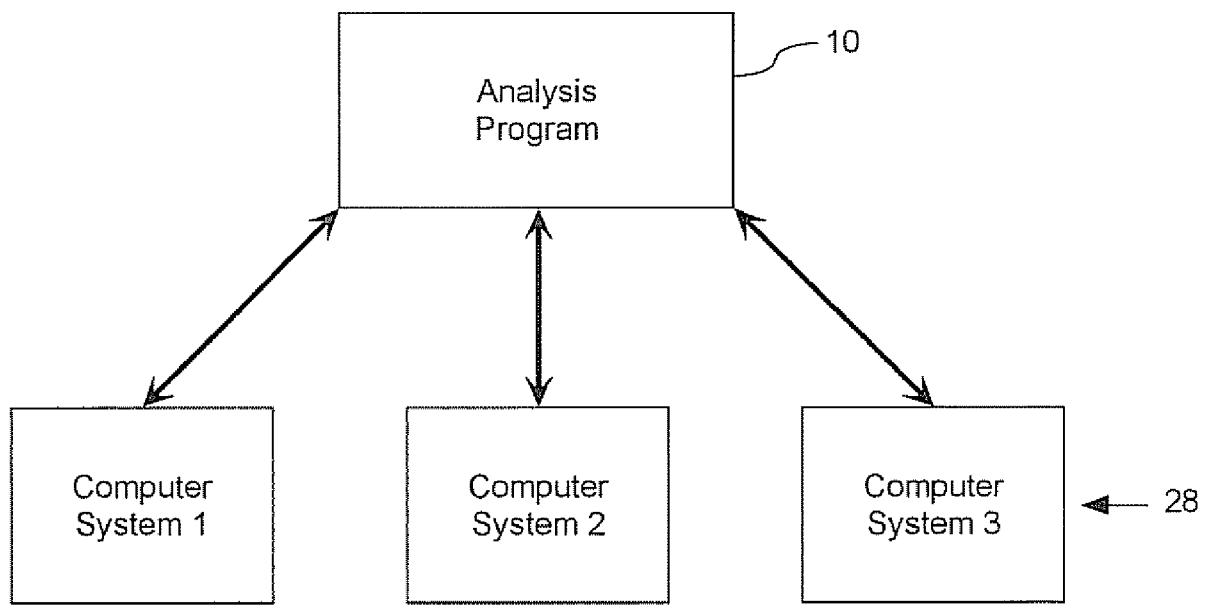
FIG. 1 is a schematic representation of a system for analyzing computer systems.

Referring to FIG. 1, an analysis program 10 collects data from a set of computer systems 28 (3 are shown in FIG. 1 as an example). The computer systems 28 may be physical systems or virtual systems. The analysis program 10 builds a statistical model from the collected data and generates reports showing the distribution, variance, outliers, and trends of the parameters across the analyzed systems 28. A distinct data set is preferably obtained for each system 28.

Each data set comprises one or more parameters that relates to characteristics or features of the respective system 28. The parameters can be evaluated by scrutinizing program definitions, properties, objects, instances and any other representation or manifestation of a component, feature or characteristic of the system 28. In general, a parameter is anything related to the system 28 that can be evaluated, quantified, measured, compared etc.

For the following description, a general evaluation of differences between systems uses the following nomenclature: A target system refers to a system beings evaluated, and a baseline system is a system to which the target system is being compared. The baseline and target systems may be the same system at different instances in time (baseline=prior, target=now) or may be different systems being compared to each other. As such, a single system can be evaluated against itself to indicate changes with respect to a datum as well as how it compares to its peers.

Architecture Overview

Figure 2:
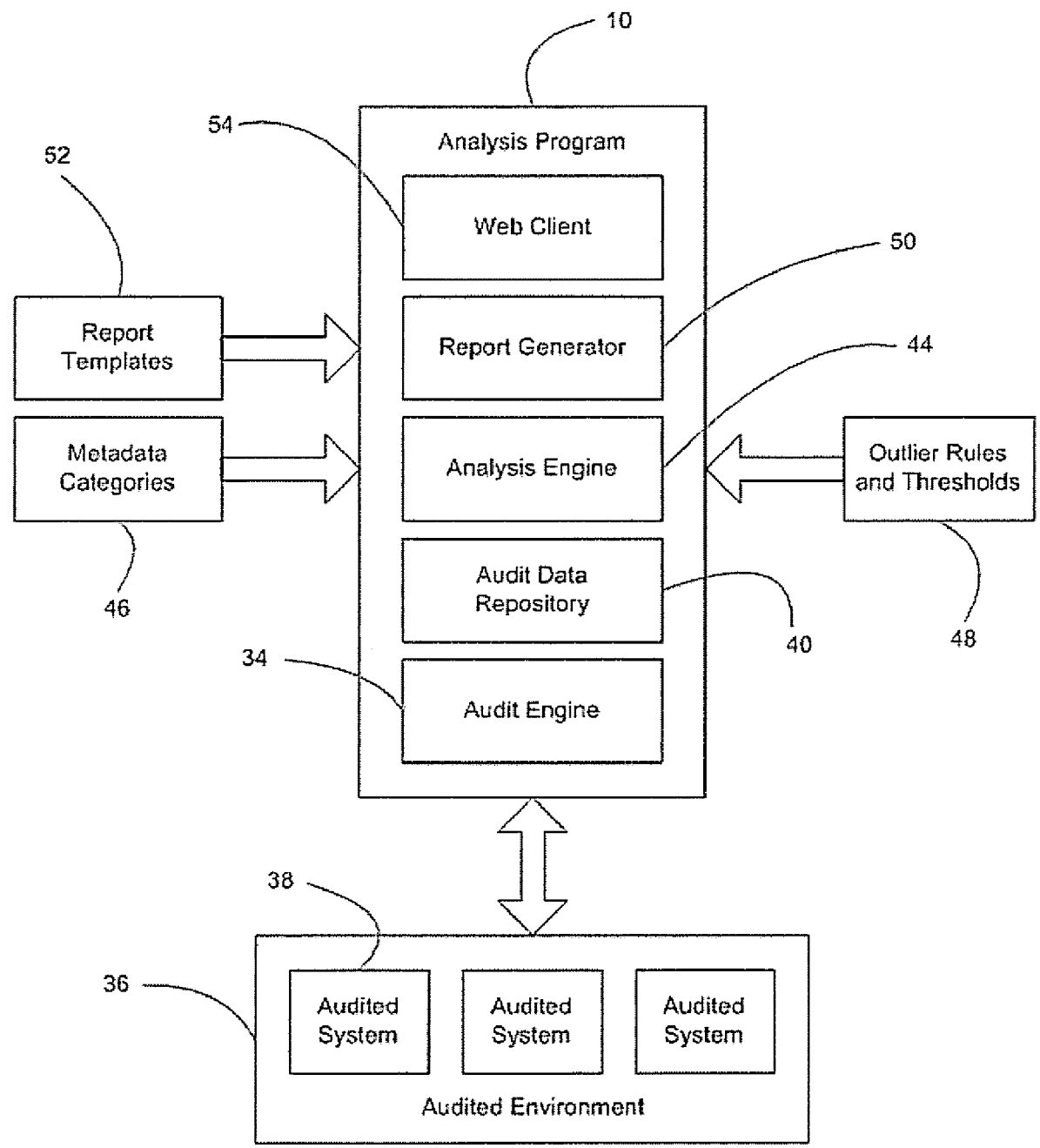
FIG. 2 is a schematic block diagram of an underlying architecture for implementing the analysis program of FIG. 1.

An example block diagram of the analysis program 10 is shown in FIG. 2. Typically, the flow of data through the program 10 begins when the user initiates an audit through the web client 54. This causes the audit engine 34 to pull audit data from audited environments 36 comprised of the systems 38 being analyzed (e.g. servers, desktop computers, etc.).

The audit engine 34 collects data from audited systems 38 through a variety of data acquisition (DAQ) adapters. DAQ adapters are typically classified as agent-based, agentless or ESM (Enterprise Systems Management) framework-based. Agent-based DAQ adapters such as SNMP request data directly from agents running on the audited systems. Agentless DAQ adapters such as Secure Shell (SSH) and Windows™ Management Instrumentation WMI) minimize the need to install additional software on the audited systems by communicating through native system services. ESM framework-based DAQ adapters (such as Tivoli Management Framework) leverage third-party ESM frameworks that manage the systems of interest 38. The DAQ adapters used depend on the available system instrumentation and the desired audit data.

Figure 3:
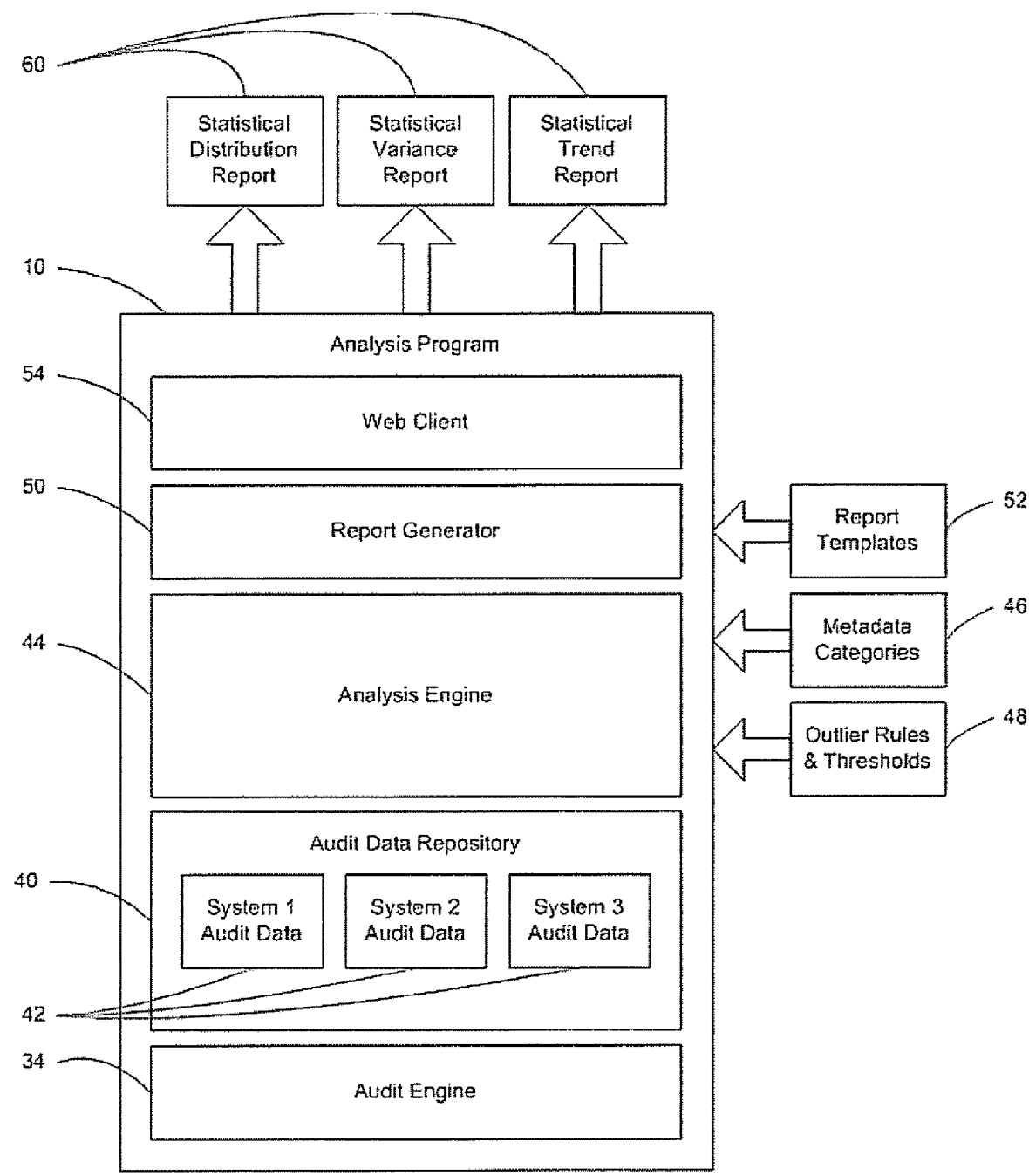
FIG. 3 is a schematic diagram of the analysis program showing data flow pertinent to generating the statistical reports.

The data collected by the audit engine 34 is stored in the audit data repository 40 for subsequent analysis and reporting. As shown in FIG. 3, audit data 42 of selected systems can be retrieved from the repository 40 and evaluated by the analysis engine 44 to perform distribution, variance, and trend analyses. The analysis engine 44 uses metadata 46 to categorize the data and filter extraneous data. The analysis engine also uses outlier rules and thresholds 48 to evaluate and detect outlier values.

The distribution analysis builds a statistical model comprised of frequency distributions, numerical statistics and uniformity measures of the audit data from a set of selected systems 48. This model is used to detect outlier data values inconsistent with the remainder of the data set. Outlier values are rolled up for each meta category and at the system level to provide an overall outlier measure for each system.

Given sets of target and baseline system audit data 48, the variance analysis builds a statistical model from the baseline system, and compares each target against the model. This analysis detects outlier values associated with the target systems relative to the baseline. As with distribution reports, outlier values are combined at the meta category and system levels to provide overall assessments of the outliers.

Given sets of target and baseline system audit data 48 from different points in time, the trend analysis compares the target against the baseline analysis results to assess the trends of the uniformity and conformity measures of the parameters over time.

A report generator 50 utilizes a set of report templates 52 to generate reports 60 presenting the analysis results of the selected systems. Typically, the program 10 supports a web client 54 to allow a user to enter settings, initiate an audit or analysis, view reports, etc.

Example Analysis Program Deployment and Audit Environment

Figure 4:
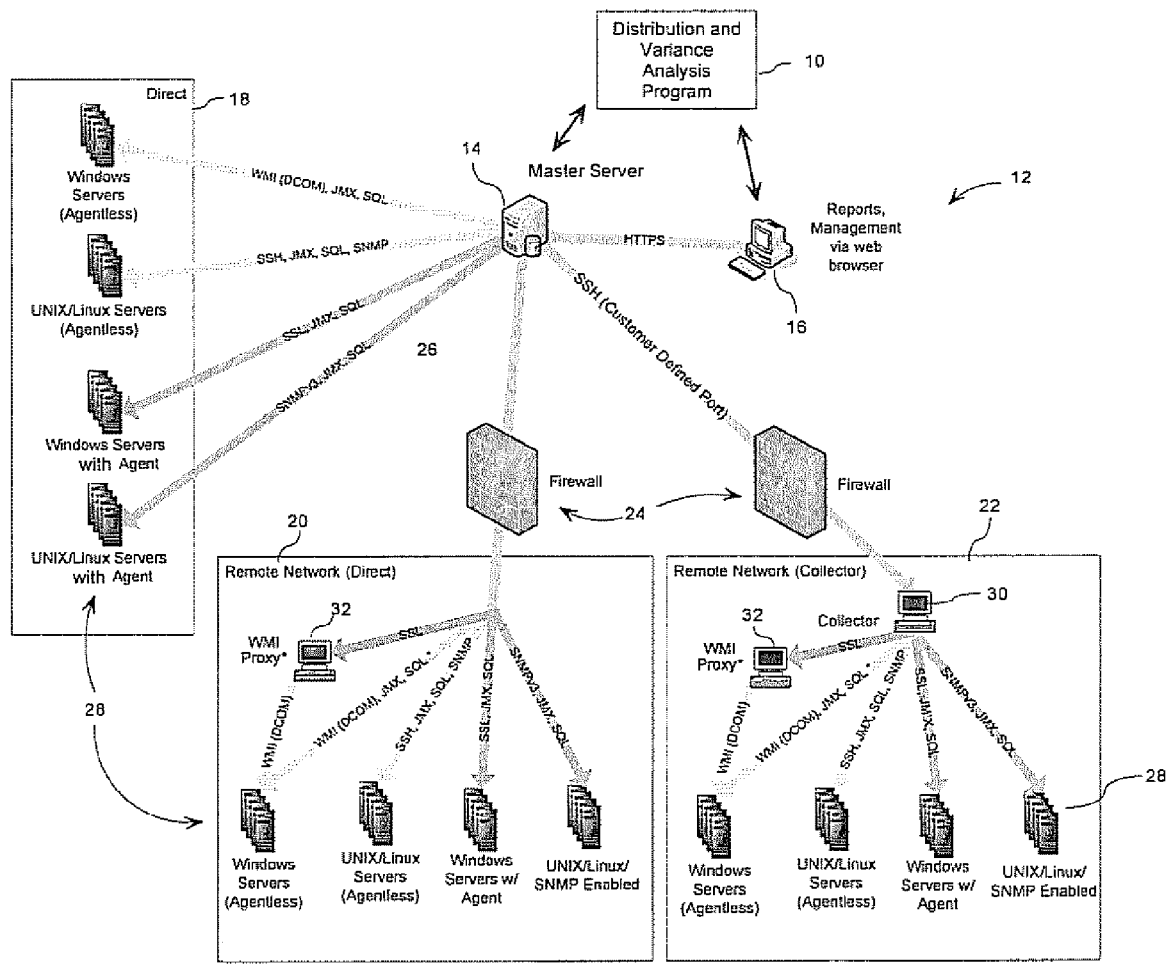
FIG. 4 is a schematic representation of an exemplary network of systems analyzed by the analysis program.

Referring to FIG. 4, the distribution and variance analysis program, also generally referred to by numeral 10 is deployed to gather data from the exemplary computing environment 12 and uses this data to evaluate each system 28 with respect to the other systems 28.

The analysis program 10 is preferably part of a client-server application comprising a master server 14 accessed via a web browser client 54 running on a remote computer station 16. The audited systems 28 are exemplified as UNIX™, Linux™ and Windows™ servers running in a local network 18 and a pair of remote networks 20, 22. Some servers have local agents and others are agentless.

In the example, the master server 14 collects system configuration settings, workload data, etc. from the audited servers in the local network 18 using protocols such as SNMP, WMI, SSH, etc. With the help of a slave collector 30 and proxies 32, the master server also audits servers in pair of remote networks 20, 22 through firewalls 24.

The proxy 32 is used to audit agentless Windows™ based server via WMI. It converts firewall-friendly TCP connection-based audit requests to the less firewall-friendly Windows™ WMI protocol requests. A proxy 32 is deployed in the remote network 20 to avoid the need to open a port range in the firewall 24.

A slave collector 30 is deployed in the remote network 22 to audit the servers locally. In turn, the master server 14 collects the audited data from slave collector 30 through the SSH protocol. This configuration simplifies the communication through the firewall 24. The proxy 32 may also be required to audit agentless Windows™ based server via WMI if the slave collector 30 is running on a non-Windows™ operating system such as UNIX™ or Linux™.

As shown, the web client running on the computer station 16 interacts with the master server 14 to operate the analysis program 10. The web client gathers user input for executing an audit or analysis and displays reports. The analysis program 10 can gather data directly from servers, or load audit data collected by other master server instances. As such, the analysis program 10 can operate in the environment 12 or independently (and remote thereto) so long as it can obtain audited data from the environment 12 for analyzing the parameters of audited systems 28.

Overview of Reports

FIG. 3 shows three types of statistical reports 60 generated by the report generator 50, namely a distribution report, a variance report and a trend report.

Figure 9:
FIG. 9 is a graphical outlier matrix.

The Distribution Report assesses the uniformity of the parameters of a population of systems. The report provides frequency distributions and statistics describing the data values from the analyzed systems 38. It measures the uniformity of data values across the systems 38 and identifies outlier values that may indicate incorrect or out of date values on the analyzed systems. Outliers are organized by meta categories and summarized for each system 38 to produce overall outlier scores for each system 38. Outliers 38. FIG. 9 shows an example graphical matrix 64 showing outlier scores for an arbitrary list of systems in the rows and the corresponding metadata categories in the columns The Variance Report assesses the conformity of one or more target systems against a reference data set comprised of a set of baseline systems. The report compares each target system individually against the reference data set to measure the consistency of the target's parameters. Similar to the distribution report, this analysis identifies outlier property values and summarizes the outlier values by meta category and for the overall system. The outlier values may be indicative of incorrect or out of date values on the target systems.

The Trend Report shows trends in the uniformity and conformity measures of the parameters by comparing the statistical analysis results of a set of systems at two or more points in time. Uniformity trends indicate whether data values for a specific property are converging or diverging. In general, a convergent trend in the data values is preferred to promote consistency among the systems. Conformity trends can imply whether specific data values are "leaders" (value is becoming more common or popular) or laggards (value is becoming less common). Empirically, leaders may indicate an improved parameter setting that is becoming more widely adopted. Conversely, laggards can indicate inferior or obsolete settings.

Distribution Report Generation

Figure 5:
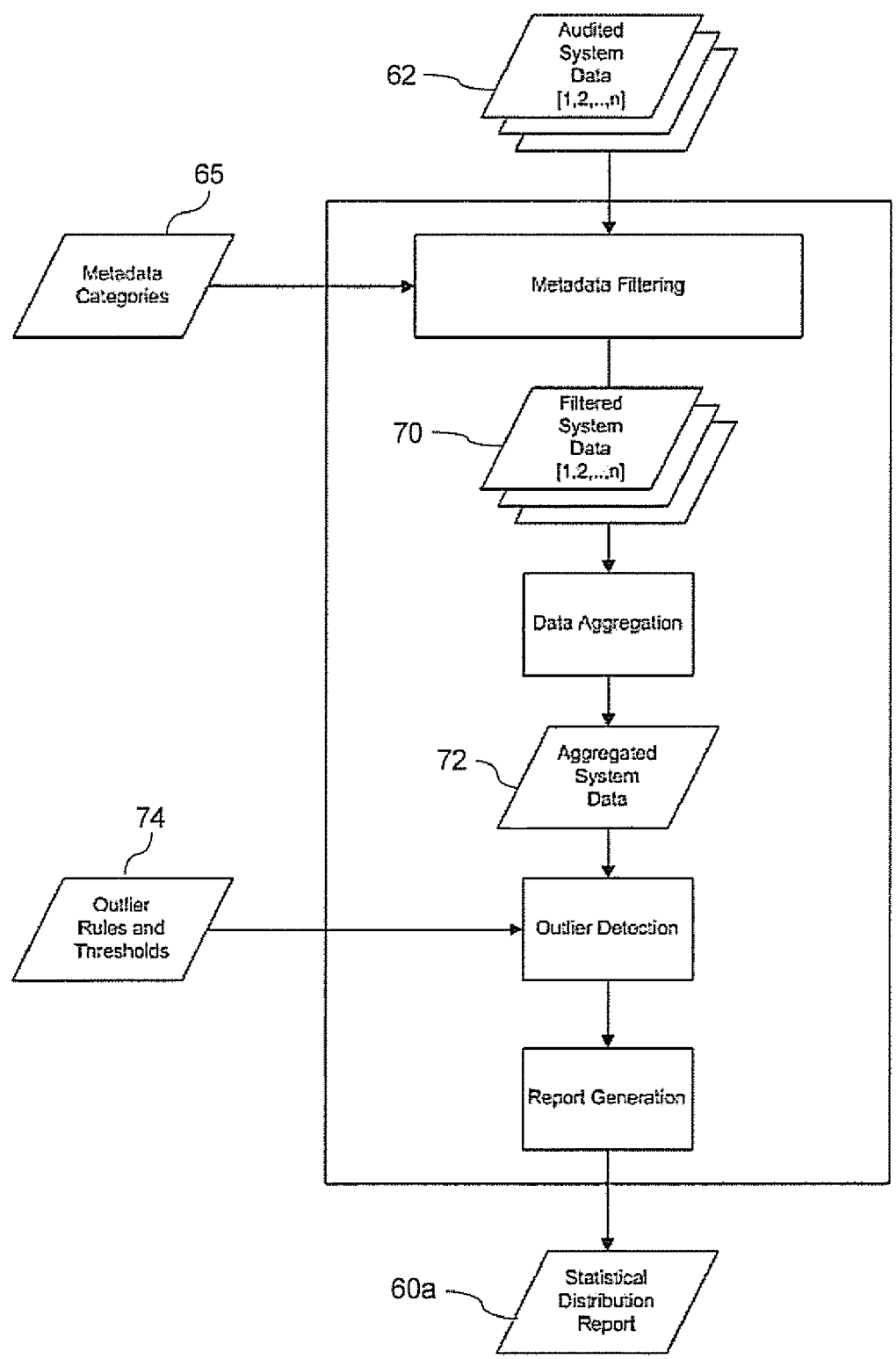
FIG. 5 is a flow chart illustrating the generation of a distribution report.

A flowchart illustrating the generation of a distribution report is shown in FIG. 5. The audited system data 62 refers to detailed per-system data models that are typically collected through the above-described auditing process from the systems 28 of interest.

For each system 28, the data model can be organized into a hierarchy of modules, tables, objects, properties and instances. In general, each system data model can contain one or more modules, each module can contain one or more tables and/or objects, each table typically comprises one or more column properties and can contain zero or more row instances, and each object contains one or more scalar properties. System data may include OS settings, hardware configuration, installed software, patches, application settings, performance and workload data, etc.

FIG. 10 provides a sample system data set 62 acquired and/or obtained and/or stored by the analysis program 10 at a particular time, for an arbitrary system (herein named server01). The sample data set 62 includes a hardware details object, operating system details object and a network interfaces table. The hardware details object lists hardware-related properties such as total number of CPUs, CPU architecture etc. and the corresponding value. Similarly, the operating system details object lists various OS properties such as the hostname, OS name etc., and the corresponding value (e.g. hostname=server01). The network interfaces table lists network interface properties such as the IP address for the system, the type of interface, domain name etc.

FIG. 5 also shows metadata categories 65 as an input for the generation of the distribution reports 60a. Meta category definitions 65 are pre-defined specifications that classify system data properties into logical categories. Specific meta categories can be selected to identify the categories of data to include in the analysis and report.

Figure 12:
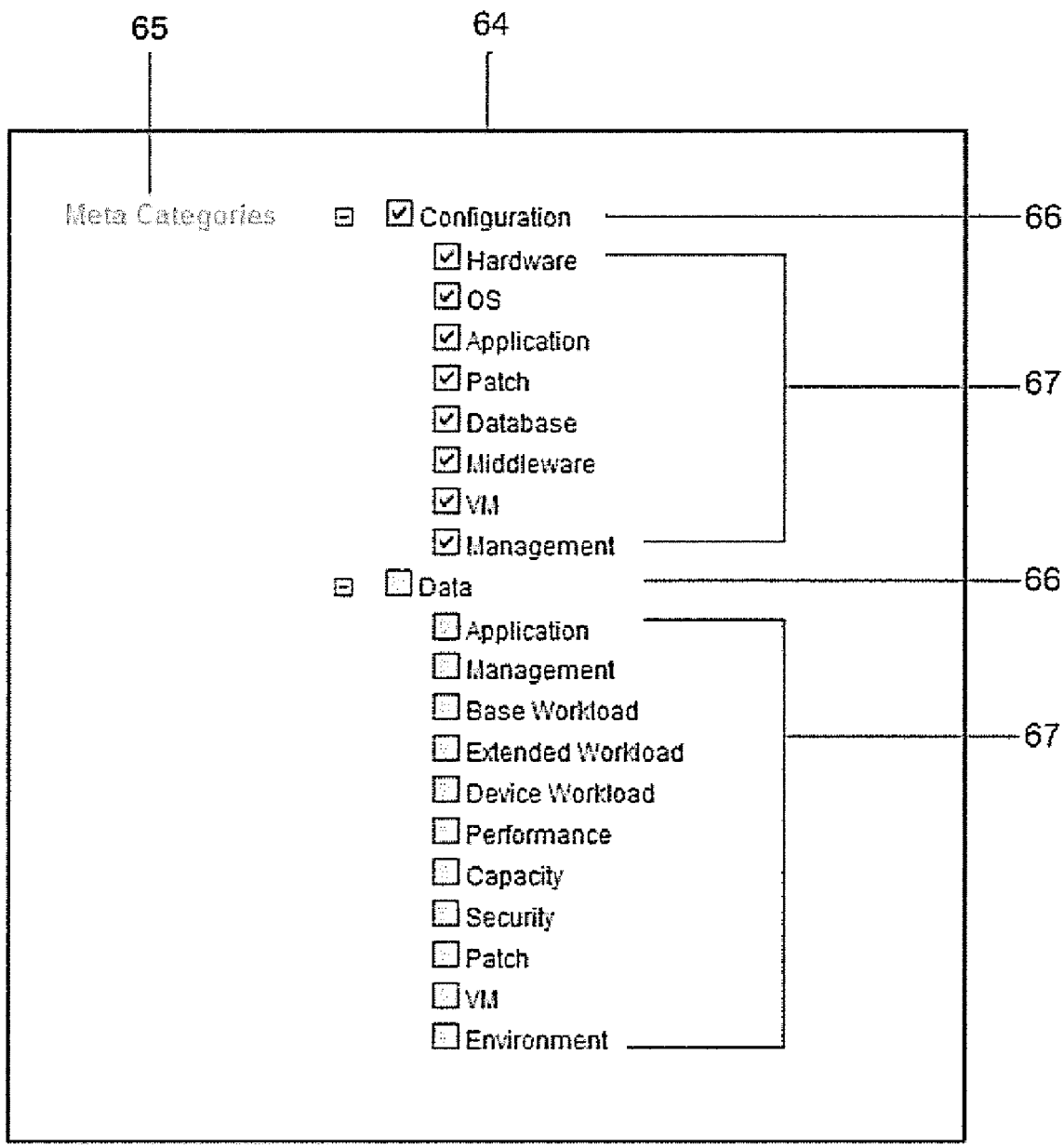
FIG. 12 is a metadata category selection page.

FIG. 12 illustrates an example meta category selection page 64. Meta categories are typically defined at multiple levels, in this example, category 66 and subcategory 67. Preferably, system data 62 is broadly categorized as configuration and data (run-time). Configuration subcategories 67 may include, e.g., hardware, OS, application, path etc. Run-time subcategories 67 may include, e.g., application, management, etc.

FIG. 11 illustrates a sample metadata category definition pertaining to the properties shown in FIG. 10. For example, in the hardware details object, the CPU architecture property (e.g. Intel™ Xeon™) is categorized under hardware configuration data; in the operating system details object, the hostname (e.g. server01) is categorized under OS configuration data; and in the network interfaces table, the IP address (e.g. 10.0.0.101) is also categorized under OS configuration data.

Turning back to FIG. 5, a metadata filtering step classifies and filters the input system data 62 using the selected metadata categories 65, to create filtered per-system data 70. The system data 62 typically contains configuration and run-time data in a variety of areas that may or may not be of interest, including hardware, OS, application, patch, performance, environment etc. The system data 62 can be filtered with the user-selected meta categories 65 to confine the analysis and report to areas that are of interest. For example, selecting the Configuration/Hardware and Configuration/OS meta categories 65 focuses the report to cover hardware configuration and operating system (OS) settings only (e.g. Total CPUs, CPU architecture, memory, OS name, OS version, patch level, network settings, etc.).

The metadata filtering step is preferably performed early in the overall report generation process to reduce the working data set 62 to make downstream processes such as data analysis and reporting more computationally efficient.

Using the filtered system data 70, a data aggregation step may then be performed. The data aggregation sub-steps are visualized in FIG. 6. Data aggregation compiles multiple filtered per-system data into a statistical data model, referred to herein as the aggregated system data 72. The aggregated system data 72 is a statistical data model of the filtered data of multiple systems. The statistical data model's structure is closely aligned with the system data model organized as a hierarchy of modules, tables, objects, properties and instances.

Figure 6:
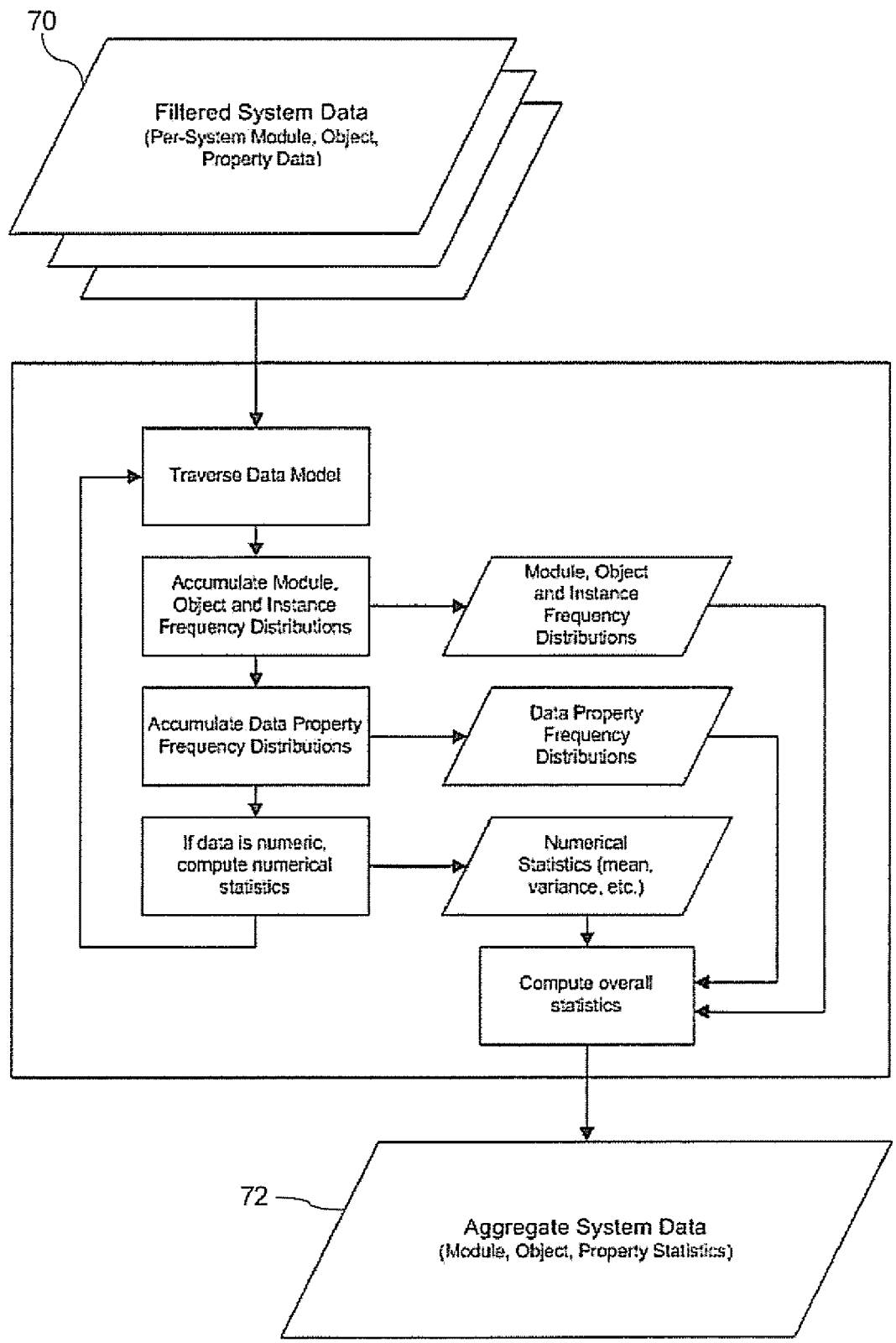
FIG. 6 is a flow chart illustrating a data aggregation procedure.

Referring to FIG. 6, for each filtered baseline system, the data model hierarchy is first traversed (module/table/object/property/instance). FIG. 13 illustrates a selected sample set of audit data for a set of fifteen (15) arbitrary server systems, server01 through server15. It will be appreciated that the sample data set is limited to four properties, namely OS name, total CPUs, domain name and IP address for illustrative purposes only. Typical statistical analyses can involve thousands of properties.

The traversal preferably accumulates module, table, object, and instance frequency distributions, which compiles occurrences of each module (erg. Generic System Information), table (e.g. Network Interfaces), object (e.g. Hardware Details), and table row instance (e.g. LAN in the Network Interfaces table). For each unique group in the frequency distributions, the list of corresponding systems (e.g. server01, server02 etc.) is also tracked.

The traversal also preferably accumulates the frequency distribution for every data property by treating them as categorical data. Cateuorical data are types of data that can be divided into groups. For example, the OS Name property in the Operating System Details object can have values like Windows, Linux, Solaris, AIX, etc. For every unique data property group value in the frequency distribution and the list of corresponding systems (e.g. server01, server02 etc.) are maintained. FIG. 14 illustrates example frequency distributions of the selected properties listed in FIG. 13. In the example shown, the Windows™ OS name was detected on 10 of 15 systems, whereas the Linux OS name was detected on 3 of 15. It can also be seen that every system included the same domain name property "abc.com", however, as expected, each system has a different IP address.

For each property, a uniformity index (UI) can be computed to measure the homogeneity of the property values across the population of systems 38 being evaluated. The uniformity index ranges from 0 to 1. UI approaches 0 when the data set is comprised of singletons, and UI approaches 1 when all the values in the data set are the same. In general, a higher uniformity index represents greater consistency in the property values.

The UI can be calculated for a property as follows:

$$UI = \sqrt{\frac{\sum_{i=1,B} [N_i * (N_i - 1)]}{T * (T - 1)}} \; ;$$

Where T is the total number of values, B is the total number of distinct values, and $N_i$ is the number of occurrences of the value $V_i$. To handle the special case where T=1 (single sample value), UI is automatically set to 1.

For example, the uniformity index of the OS name property from the example data set in FIGS. 13 and 14 can be computed as follows:

$$UI = \sqrt{\frac{10*9 + 3*2 + 1*0 + 1*0}{15*14}} = 0.68$$

A summary of statistics for the sample data properties listed in FIG. 13 is shown in FIG. 15. The domain names, which are all the same in the sample data set, have 100% uniformity. Conversely, the IP addresses, which are all unique in the sample data set, have zero uniformity.

The traversal also preferably accumulates data property statistics, where, if the data property is numeric (e.g. total CPUs), the numeral statistics are computed, e.g. mean, minimum, maximum and standard deviation. As shown in FIG. 15, the total CPUs property for this particular data set includes 2 unique values, which results in a high UI of 0.93, mean of 2.1, standard deviation of 0.52 and min and max values of 2 and 4 respectively.

A list of relevant systems 28 may also be maintained for the frequency distributions. FIG. 21 shows the different OS names found in the example data set, and the corresponding systems associated with the distinct property values. It will be appreciated that the details listed in FIG. 21 may be included in a summary report page. The overall statistics may then be computed, which calculates total systems, modules, tables, objects, properties, etc. that make up the statistical model.

Turning back to FIG. 5, the outlier detection step is then performed on the aggregated system data 72 prior to generating the statistical distribution report 60a. This step involves computing the conformity indices, conformity scores, and detecting outliers.

For a specific property value, the conformity index (CI) measures the degree to which the value is consistent with the remainder of the data set. The conformity index ranges from 0 to 1. The higher the CI, the more consistent the value is with its peers. The conformity index for a specific property value ($V_i$) can be computed as follows:

$$CI_i = \frac{2}{1 + e^{\gamma * R_i}}$$

Where Gamma (γ) is the shape factor and is set to 0.9 in this example to yield an appropriate sigmoidal function for the conformity index as it ranges from 0 to 1, and $R_i$ is computed as follows:

$$R_i = \frac{\sqrt{T*(T-1)} *(B-1)}{N_i * B^2}$$

Where T is the total number of values, B is the total number of distinct values, and $N_i$ is the number of occurrences of value i.

For example, the total CPUs property from the sample data set contains 15 values comprised of 2 distinct values with the frequency distribution of 14 and 1, CI for the least frequent total CPUs value (number of 4-CPU systems is 1) can be computed as follows:

$$R_i = \frac{\sqrt{15*14} *(2-1)}{1*2^2} = 3.37$$

$$CI_i = \frac{2}{1 + e^{0.9*3.37}} = 0.09$$

The low conformity index of 0.09 indicates that 4-CPU systems are not common in the sample data set.

Conversely, the CI for the most frequent total CPUs value (number of 2-CPU systems is 14) is 0.89. The high conformity index implies that 2-CPU systems are significant more common in the sample data.

Outlier rules 74 identify the properties of interest and specify associated weights that signify the property's relative importance in the outlier analysis. Rule weights range from 0 to 1 with a higher weight indicating a greater relative importance of the property.

Further details pertaining to rules and their use in analyzing and evaluating computer system parameters can be found in co-pending U.S. patent application Ser. No. 11/535,308 filed on Sep. 26, 2006, the contents of which are incorporated herein by reference. It shall be noted that the conformity and uniformity analyses described herein may be used to create new rule definitions and/or rule sets, e.g. for targeting new parameters in a compatibility analysis. Details pertaining to the usage of rules in conducting compatibility analyses can be found in co-pending U.S. patent application Ser. No. 11/535,355 filed on Sep. 26, 2006, the contents of which are also incorporated herein by reference.

The conformity score (CS) combines the conformity index with the property's corresponding rule weight as follows:

$$CS=(1-weight*(1-CI))$$

Conformity scores can rank outlier values as a function of the property's relative importance and its degree of non-conformance. Conformity scores range from 0 to 1 with low conformity scores indicating severe outliers. Conversely, high conformity scores indicate that value is consistent with its peers. A weight of 0 results in a conformity score of 1, while a weight of 1 produces a conformity score equal to the corresponding conformity index.

FIG. 11 shows an example set of outlier rule weights pertaining to the sample data properties. In this example, the OS name and domain name properties are assigned weights of 1, IP address is assigned a weight of 0, and total CPUs is assigned 0.5.

For example, given a CI of 0.09 and a weight of 0.5, the CS is:

$$CS=(1-0.5*(1-0.09))=0.54$$

A set of threshold ranges for the conformity score 74 is an input to the outlier detection process. The ranges define varying levels of severity of non-conformity and the matrix 64 shown in FIG. 9 conveys such information visually in a graphical form. An example set of outlier threshold ranges as percentages is:

0 to 1—Severe outlier
2 to 25—Outlier
26 to 60—Mild Outlier
100 to 99—Not significant
100—Value is consistent For each system, the conformity scores can also be rolled up for each meta category combining the scores of all the property values classified under the category. The conformity score can be further rolled up to the system level by combining the scores for all the meta categories. The overall conformity scores can be computed as follows:

$$CS_{Overall}=CS_1*CS_2*CS_3$$

Turning back to FIG. 5, a report generation step is then performed. This step generates the distribution report 60a, preferably organized into multi-level hyperlinked HTML pages. The report highlights the detected outliers, and provides views for summary information and statistical details, which can be viewed by navigating within the data model hierarchy. The distribution report is organized as follows, making reference to FIGS. 16 through 21, which provides example distribution report pages for an arbitrary set of systems named server01 through server15.

The top page of the report is the system conformity scorecard shown in FIG. 16. This page presents the top overall outliers in a color coded matrix 66 similar to the matrix 64 shown in FIG. 9. In FIG. 16, the conformity scores (CS %) are displayed as percentages in the matrix cells for each system. The conformity scores are shown for the selected metadata categories (e.g. hardware and OS) as well as an overall system score. Typically, the systems are sorted by the lowest overall score to highlight the top outliers. Preferable, the scorecard supports the option to hide the non-outlier systems.

As noted above, the cells are color coded based on the outlier's threshold ranges. An example color coding scheme is as follows:

Red—Severe outlier
Orange—Outlier
Yellow—Mild Outlier
Green—Not significant
Dark Green—Value is consistent The conformity scorecard in FIG. 16 highlights two outlier systems: server15 and server14. Details of the system property values that contributed to the conformity scores can be viewed by selecting the corresponding cells.

From the conformity scorecard page, selecting the Outlier Summary hyperlink accesses a Summary of Outliers page as shown in FIG. 17. This page lists the top outlier property values that apply to one or more of the analyzed systems. In this example, the top six (6) outliers from the sample data set are listed.

Alternatively, selecting the Full Statistics hyperlink from the conformity scorecard page accesses the statistical data model details. The data is organized according to the system data model hierarchy comprise of module tables and objects, properties details, instance details and system lists. These pages are depicted in FIGS. 18 to 21.

The top statistical data model page presents the composite data values arranged by the module tables and objects. Property data is summarized by showing the most common (or average for numerical properties) as well as the uniformity index of the property. FIG. 18 depicts the composite data for the generic system information module objects and table (hardware, operating system, network interfaces). In this example, the total CPUs property value is reported by its average value, 2.1, while the OS name property is reported by its top value, Windows. Singleton properties like IP addresses are denoted as being all unique, whereas properties whose values were all the same are reported accordingly.

From the top statistical data model page, a specific table or object can be selected to access detailed property statistics associated with the selected item. For each related property, the detailed statistics reported include the number of unique values, the uniformity index, the top 3 values and their corresponding conformity indices. If property value is numeric, the mean, range, and standard deviation are also reported.

FIG. 19 provides details for a selected list of properties, in this example, OS name, Total CPUs, Domain Name and IP address. It will be appreciated that the properties listed typically belong to a specific table or object, and the selected sample shown in FIG. 19 is for illustrative purposes only.

The instance details pace is shown in FIG. 20, which shows details statistics from the table row instance perspective presenting the top 3 property instance values, and, if applicable, numerical statistics. This page also reports the number of occurrences of each row instance in the table across the sample data set.

The corresponding list of systems associated with each property value is reported in the system list page. The page shown in FIG. 21 provides a list of the systems and the corresponding OS name values. The system count row summarizes the distribution of the OS name among the systems being analyzed.

It will be appreciated that the report pages shown in FIGS. 16-21 are for illustrative purposes only and can be presented in any number of variations as required. For example, the summary tables may be presented in hyperlinked HTML pages or other graphical outputs that can be displayed, stored and analyzed by a user. Also, the top N values (not just the top 3) may be displayed in the property and instance details. Additional statistics such as medians, quartiles, inter-quartile ranges, etc. may be compiled and reported for numeric property values.

Variance Report Generation

Figure 7:
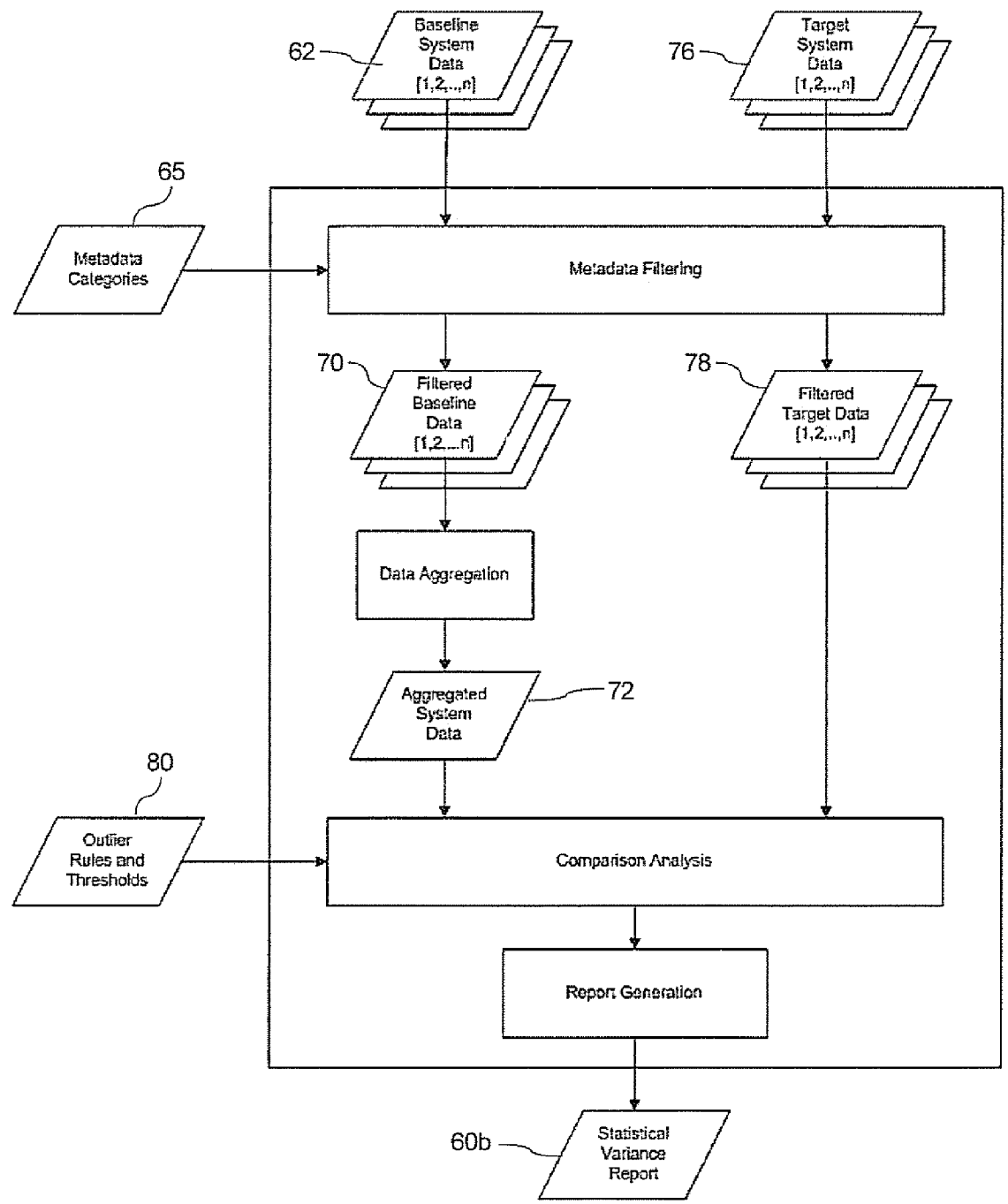
FIG. 7 is a flow chart illustrating the generation of a variance report.

The generation of a system variance report 60b is shown in FIG. 7. For the variance report 60b, one or more target systems 76 are individually compared to a set of baseline systems 62. A statistical model 72 is constructed from all of the baseline systems, which, as explained above, includes the frequency distribution of settings across the sample set and numerical statistics (when applicable). Each target system is compared to the baseline model (aggregated system data 72) in order to determine, on a setting-by-setting basis, whether the target system is above/below average, using common/uncommon settings etc. Alternatively stated, the variance report 60b indicates whether the target system is an outlier with respect to a given setting.

As seen in FIG. 7, the target system data 76 are inputs to the variance report generation process where the data 76 is compared to the aggregated system data 72 in a comparison analysis. The filtered target system data 78 is obtained in a manner similar to the filtered baseline data 70, as explained above.

In the comparison analysis, each property in the filtered target system data 78 is analyzed against the aggregated system data 72 for the baseline systems. To assess whether the target value is an outlier, the conformity index and weighted score is computed and evaluated against the set of outlier threshold ranges 80. The conformity indices, scores and outlier threshold ranges 80 are in generals analogous to the outlier measures discussed in detail above. The conformity scores provide a relative measure of how each target system's property values compare against their peers (i.e. the particular collection of baseline systems). Low conformity scores indicate outliers. Depending on the threshold range the conformity score falls in 80, the target's property value may considered to be somewhere between a severe outlier and a consistent value.

The comparison analysis, for each data property in the aggregated system data 72, comprises computing the target property's rank, percentile and standard deviation relative to the statistical model, and computing the target's conformity score and comparing this to the set of outlier threshold ranges 80. A report generation step is then performed to produce the variance report 60b.

The statistical variance report 60b shows how the target systems compare against the statistical model derived from the baseline systems. Preferably, the variance report is comprised of a multi-level hyperlinked HTML report, similar to that produced for the distribution report 60a. The target systems are listed as the rows and the meta categories and overall scores represent the columns. Details of the outlier values that comprise the conformity scores are accessed by selecting the appropriate cell. Selecting the target system in the matrix accesses the comparison analysis details for the selected system. Like the distribution report, full statistics and an outlier summary can also be accessed through hyperlinks at the top of the scorecard page of the variance report.

An example of a variance analysis and report is illustrated through FIGS. 22 to 25. FIG. 22 depicts the sample data of a target system, server99 that will be compared against the sample data set comprised of the 15 systems shown in FIG. 13. As such, for this example, the baseline systems are server01 to server15.

Performing the variance analysis based on the sample data sets for these target and baseline systems generates the variance report conformity scorecard shown in FIG. 23. The example matrix 68 in FIG. 23 visually shows the variance of the target system server99 against the baseline systems with respect to the Hardware and OS meta categories as well as the overall system. The overall conformity score of 4 denotes that server99 is an outlier system.

Selecting the overall score for server99 in the scorecard matrix accesses the outlier summary page for the system shown in FIG. 25. This page lists the outlier property values of server99 that contributed to its poor score. The primary outlier property is the domain name.

Alternatively, selecting the server99 label in system column of the scorecard matrix accesses the comparison details for server99, shown in FIG. 24. This page is organized by the system data model hierarchy (modules, tables, objects, etc.) shows how each property compared against the baseline systems.

Trend Report Generation

Figure 8:
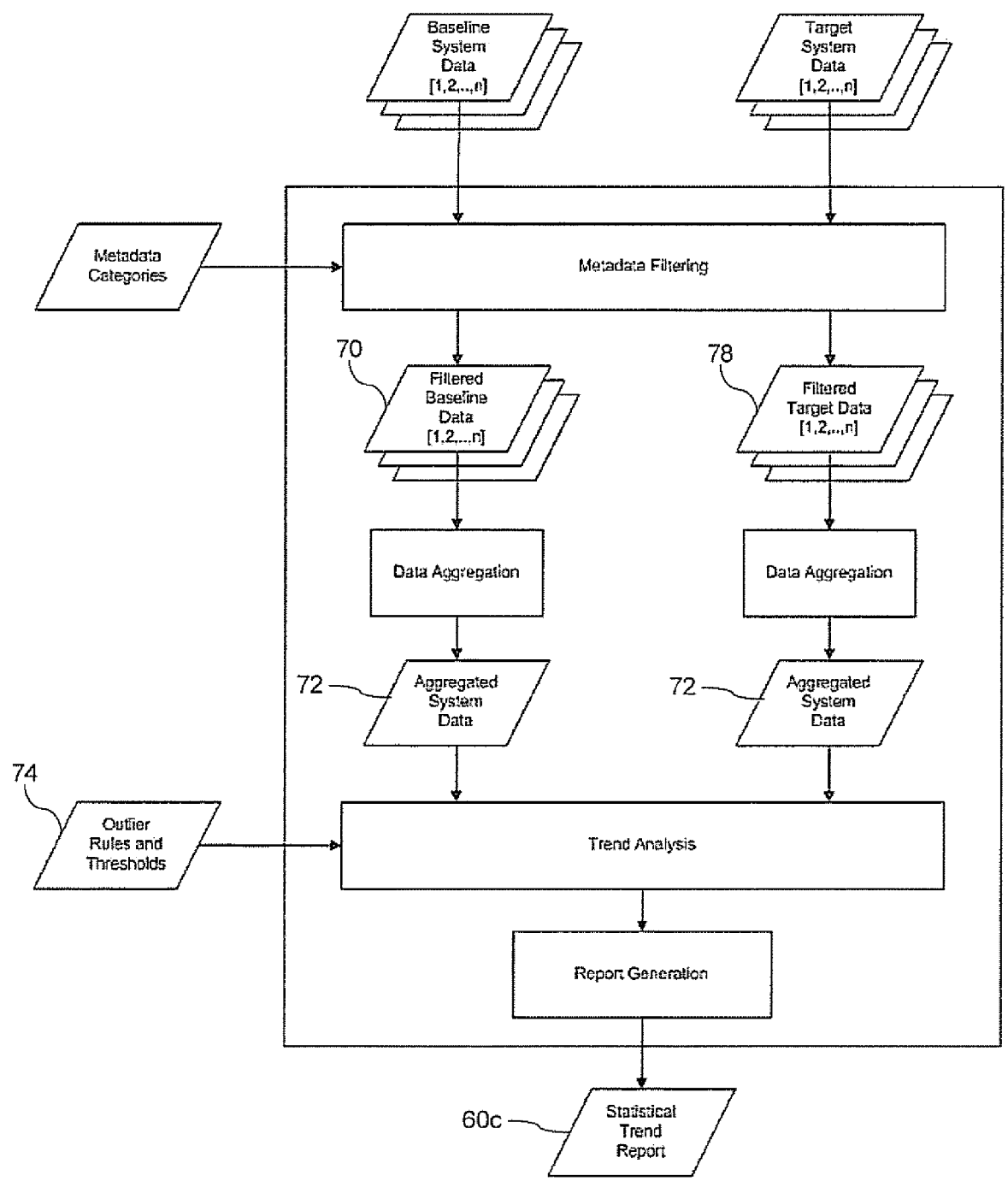
FIG. 8 is a flow chart illustrating the generation of a trend report.

The statistical trend report 60c compares data sets of target and baseline systems from two instances in time. FIG. 8 shows a procedure for performing the analysis and generating the trend report 60c. This report tracks the trends in the uniformity and conformity of property values over time. This is done by creating separate statistical data models 72 for the target and baseline systems. Outliers are then found separately for the target and baseline systems. The analysis results, specifically the uniformity index and conformity scores are then compared between the target and baseline systems in a trend analysis.

The absolute value of the chance in index or score is then evaluated against a set of change threshold ranges. Separate threshold ranges can be defined for the uniformity index and conformity scores. An example set of change threshold ranges for the uniformity indices can be as follows:

0 to 0.05—Not significant 0.06 to 0.10—Notable trend 0.11 or greater—Significant trend Uniformity indices increasing over time indicate that the data property values are converging to more consistent values. Uniformity indices decreasing over time indicate that the data values are diverging into a less consistent data set.

The change in the conformity score of a specific data property value and its actual score can indicate the adoption stage of the property value. At general level, leaders can be considered to be any property value whose conformity scores are increasing, whereas laggards have scores that are decreasing.

At a more granular level, the adoption stages can be categorized as innovators, early adopters, early majority, late majority and laggards. An innovator is defined by a data property value with a very small conformity score (severe outlier) that is increasing over time. A mild outlier whose conformity score is increasing may be an early adopter. Early majority is typified by non-outlier values whose conformity scores are increasing. Late majority is defined by highly conformant values whose conformity score is decreasing. Finally, laggards are defined by less conformant scores whose conformity is decreasing.

The trend report is preferably presented as a multi-level hyperlinked HTML report. The top page lists the property values with the largest uniformity and conformity score changes. These indices and scores are color coded, depending on the size of the change and whether they are increasing or decreasing. For each property value, detailed statistics about the property value are available in a hyperlinked page.

FIG. 26 shows sample audit data for a set of systems, which include the systems listed in FIG. 13 and additional systems, where the data is obtained at a later time. It can be seen that at the point in time shown in FIG. 26, 5 additional servers, namely server16 through server20 did not exist at the earlier point in time.

For example, the sample data for the fifteen (15) systems shown in FIG. 13 and the sample data for twenty (20) systems shown in FIG. 26 can be considered as baseline and target data sets, respectively. A comparison of the frequency distributions of a sub-set of the properties from the data sets is summarized in FIG. 27. In the target sample, five (5) 4-CPU Linux OS-based systems have been added. New IP address values have also been added by the new target systems.

FIG. 28 shows the resulting trend report. The report indicates the relevant dates for baseline and target data as well as the number of systems in each data set. A uniformity trend table is also provided, which shows how the uniformity index values have changed between baseline and target data, which in turn indicates the trend. It can be seen that were the UI score has decreased, the statistics are less uniform and thus the values for that particular property are diverging as a whole. Also shown in FIG. 28 is a conformity trend table, which indicates how the conformity scores for certain properties have changed between baseline and target data. It can be seen that where the conformity score has increased, the property is becoming more common, which in turn indicates that the property value may be a leader. Conversely, where the CS score decreases, the property value is becoming less common and thus that property value may be a laggard (e.g. OS Name/AIX).

It will be appreciated that the adopter stage identification and reporting for data property values can be based on arbitrarily advanced adopter classification schemes (e.g. leader/laggard, innovator/early adopter/early majority/late majority/laggard, etc.).

In addition, the target-baseline trend analysis can be applied to cases involving more than two (2) data sets obtained at different points in time. These scenarios can be addressed by analysing the data sets as a time-series, and calculating uniformity and conformity trends using standard mathematical procedures such as least squares fit.

Summary and Commentary

Therefore, the program 10 can perform an audit of data pertaining to parameters from a plurality of systems in an audited environment 36 to generate statistical reports that show distribution, variance, outliers and trends across the computer systems.

The Distribution Report assesses the uniformity of the parameters of a population of systems and provides frequency distributions and statistics describing the data values from the analyzed systems 38. It measures the uniformity of data values across the systems 38 and identifies outlier values. This report also summarizes the outlier values by the metadata categories and for the overall system.

The Variance Report assesses the conformity of one or more target systems against a reference data set comprised of a set of baseline systems. The report compares each target system individually against the reference data set to measure the consistency of the target's parameters. Similar to the distribution report, this analysis identifies outlier property values and summarizes the outlier values by meta category and for the overall system. The outlier values may be indicative of incorrect, emerging, or out of date values on the target systems.

The Trend Report shows trends in the uniformity and conformity measures of the parameters by comparing the statistical analysis results of a set of systems at two or more points in time. Uniformity trends indicate whether data values are converging or diverging. In general, a convergent trend in the data values is preferred to promote consistency among the systems. Conformity trends can imply whether specific data values are "leaders" (value is becoming more common or popular) or laggards (value is becoming less common). Empirically, leaders may indicate an improved parameter setting that is becoming more widely adopted. Conversely, laggards can indicate inferior or obsolete settings.

It will be appreciated that the above principles and analyses can be performed on any type of computer system and should not be limited in applicability to servers as exemplified above. It will also be appreciated that any number of meta categories can be defined to accommodate varying data sets. Similarly, all summary reports and graphical outputs can be modified and/or adapted to any such data set and can be web accessible or localized to a particular environment 12. The analysis pro-ram 10 may be located in the particular environment 12 or may alternatively obtain audited data from a remote location.

It will also be appreciated that the trend reports 60c can be generated not only for data sets obtained at different times (same or different systems), but can also be generated based on data sets for different systems at the same time or any variation thereof and as such, should not be limited to those examples provided above.

As such, variations in physical implementations and outputs may be accommodated whilst providing similar results and, although the invention has been described with reference to certain specific embodiments, various modifications thereof will be apparent to those skilled in the art without departing from the spirit and scope of the invention as outlined in the claims appended hereto.

What is claimed is:

1. A method for determining parameter distribution for one or more computer systems comprising:
   obtaining a plurality of data sets, each data set pertaining to one of said one or more computer systems at a point in time, said data sets comprising information pertaining to one or more parameters of said one of said one or more computer systems;
   generating a statistical model comprising said plurality of data sets; and
   comparing said data sets in said statistical model to determine the uniformity of respective ones of said parameters among said data sets and to identify the existence of outlier values associated with respective data sets indicating non-uniformity of corresponding parameters.

2. A method according to claim 1 further comprising generating a statistical distribution report providing summary information and statistical details for said parameter distribution.

3. A method according to claim 2 wherein said distribution report is organized into multi-level hyperlinked pages.

4. A method according to claim 1 wherein said statistical model comprises a uniformity index for each said one or more parameters, said uniformity index being indicative of the homogeneity of each said one or more parameters among said one or more systems.

5. A method for determining consistency of parameters of one or more target computer systems in relation to a reference comprising one or more baseline computer systems comprising:
 obtaining a statistical model comprising a plurality of data sets each comprising information pertaining to one or more parameters of a corresponding baseline computer system;
 obtaining one or more data sets pertaining to said one or more target computer systems comprising information pertaining to at least one of said one or more parameters; and
 comparing said one or more data sets pertaining to said one or more target computer systems against said statistical model to determine the conformity of parameters in said one or more target systems to corresponding ones of said parameters in said statistical model and to identify the existence of outlier values in said one or more target systems indicating non-conformity of corresponding parameters.

6. A method according to claim 5 repeated for a plurality of target computer systems.

7. A method according to claim 5 further comprising generating a statistical variance report providing summary information and statistical details for said parameter variance.

8. A method according to claim 5 wherein said step of analyzing comprises computing a conformity index for a value for each of said one or more parameters, said conformity index being indicative of the degree to which said value for each system is consistent with the others of said one or more computer systems.

9. A method according to claim 8 further comprising computing a conformity score for said values for each of said one or more parameters according to a corresponding conformity index and a corresponding rule weight.

10. A method according to claim 9 further comprising combining said conformity scores to obtain overall metadata category conformity scores.

11. A method according to claim 10 further comprising combining said overall metadata category conformity scores to obtain an overall system conformity score.

12. A method for analyzing trends pertaining to one or more parameters for a plurality of computer systems over time, said method comprising:
 generating a first statistical model comprising a plurality of data sets each comprising information pertaining to said one or more parameters of a corresponding one of said plurality of computer systems at a first point in time;
 generating a second statistical model comprising a plurality of data sets each comprising information pertaining to said one or more parameters of a corresponding one of said plurality of computer systems at a second point in time; and
 comparing said first and second statistical models to determine one or more trends for said one or more parameters according to at least one of uniformity and conformity of said one or more parameters over time.

13. A method according to claim 12 wherein said first and second data sets are indicative of values at different times.

14. A method according to claim 12 wherein said first data set pertains to at least one of said plurality of computer systems and said second data set pertains to at least one other of said plurality of computer systems.

15. A method according to claim 12 further comprising generating a trend report indicating at least one of: the convergence or divergence of values in said statistical models based on said uniformity, and where said values are leading and/or lagging based on said conformity.

16. A computer readable medium comprising computer executable instructions for determining at least one of uniformity and conformity of parameters associated with one or more computer systems comprising:
 instructions for obtaining a plurality of data sets, each data set pertaining to one of said one or more computer systems at a point in time, said data set comprising information pertaining to one or more parameters of said one of said one or more computer systems; and
 instructions for obtaining a statistical model comprising said plurality of data sets;
 instructions for comparing said data sets in said statistical model to determine at least one of said uniformity and conformity of respective ones of said parameters among said data sets; and
 instructions for identifying the existence of outlier values associated with respective data sets indicating at least one of non-uniformity and non-conformity of corresponding parameters.

17. A computer readable medium according to claim 16 further comprising instructions for generating reports comprising statistics related to one or more of said uniformity and conformity.

18. A computer readable medium according to claim 16 further comprising instructions for storing said audit data in an audit data repository.

19. A computer readable medium according to claim 16 further comprising instructions for supporting a web client to enable a user to enter settings and initiate an audit to obtain said audit data.

20. A method according to claim 1 further comprising: generating a conformity score pertaining to the conformity of each of said one or more parameters; displaying a graphical interface comprising a matrix of cells, each row of said matrix indicating one of said plurality of computer systems and each column of said matrix indicating a metadata category pertaining to one of said plurality of parameters; and displaying in each cell a respective conformity score indicating the conformity of the respective one of said plurality of systems to others of said plurality of systems for a corresponding one of said one or more parameters.

21. A method according to claim 20 further comprising displaying a column in said matrix comprising overall system scores.

22. A method according to claim 20 further comprising enabling further details pertaining to said scores to be accessed by selecting a respective cell.

23. A computer readable medium comprising computer executable instructions that when executed perform the method according to claim 1.

24. A computer readable medium comprising computer executable instructions that when executed perform the method according to claim 5.

25. A computer readable medium comprising computer executable instructions that when executed perform the method according to claim 12.

* * * * *